Aug. 27, 1963 W. HODER 3,101,565

FISH HOOK AND GUARD COMBINATION

Filed July 1, 1960

INVENTOR.
William Hoder,
BY
John H. Leonard,
his ATTORNEY.

United States Patent Office 3,101,565
Patented Aug. 27, 1963

3,101,565
FISH HOOK AND GUARD COMBINATION
William Hoder, 2440 Lear Road, Avon, Ohio
Filed July 1, 1960, Ser. No. 40,430
1 Claim. (Cl. 43—43.16)

This invention relates to a fish hook, and particularly to a fish hook having a guard attached thereto to prevent the hook from being swallowed by small fish to a degree such that removal without injury to the fish is difficult.

A principal object of the invention is to provide a fish hook which may be baited and used in the customary manner as conveniently as conventional hooks, but which is provided with a guard so arranged as not to interfere with the hooking of fish of either small or large size.

Another object is to provide a conventional hook with a guard which engages the lips of a small fish to prevent the hook being swallowed or entering into the gullet of a fish which is too small for eating, or which is below the legal limit, to an extent such that the hook can be removed only with substantial difficulty and only by injuring the fish.

A specific object is to provide a fish hook with a guard so arranged that it does not interfere in any manner with the balancing of the hook as it is drawn through the water, but which presents an abrupt shoulder extending at an angle of almost ninety degrees to the plane of the hook and so positioned that, in the normal manner in which the hook is grasped by a fish, the shoulder will strike the lips of the fish and prevent the hook from passing into its mouth a distance beyond the guard, whereby only the portion of the hook from the hook end to the guard can enter the mouth of a small fish.

Other objects and advantages of the invention will become apparent from the following description wherein reference is made to the drawing, in which.

Figures 1, 2:
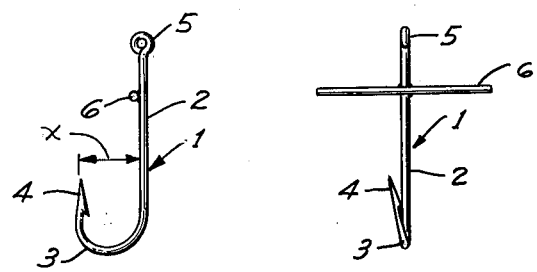
FIG. 1 is a side elevation of a hook embodying the principles of the present invention.
FIG. 2 is a front elevation of the hook illustrated in FIG. 1.
Figure 3:
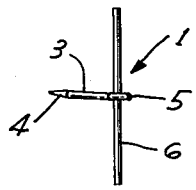
FIG. 3 is a top plan view of the hook illustrated in FIG. 2.

Referring to the drawings, the hook, designated generally at 1, has a stem or shank 2, a hook portion 3, and a barbed point 4. At the upper end of the stem or shank 2 are suitable attaching means, such as an eye or shank 5, by which the hook may be attached to a leader or line. The hook, thus described is a conventional form of hook formed of a single length of wire. The shank 2 of the hook may vary in length depending upon the style and type of hook.

As mentioned, the hook 1 is provided with a guard 6. Preferably, the guard 6 is a single length of wire which is secured to the shank 2 in fixed position axially and circumferentially of the shank. The guard 6 may be a straight length of wire and fastened, in fixed position, to the shank at a location between the point of the hook portion 3 and the eye 5.

The guard 6 is disposed substantially normal to a plane through the shank 2 and hook portion 3 so that it does not in any way overhang the point of the hook. Preferably, the guard is secured in place by spot welding and is nearer to the eye 5 of the conventional hook than to the point. In hooks having extremely long shanks, it may be disposed a substantial distance from the eye.

Usually, the guard 6 is spaced from the bottom of the hook portion 3 a distance approximately equal to its own length.

The guard 6 extends laterally of the plane of the hook equidistantly in the opposite directions from the plane. The length of the guard, at each side of the plane, is proportioned to the hook so as to be about one and one half to two times the distance from the shank 2 to the point 4, as indicated at X. This distance is preselected for the size of the hook being used so that a fish big enough to swallow the hook portion 3, but too small to keep, will be prevented from swallowing the hook to such an extent that the hook would be difficult to remove without injury to the fish.

While the bar or guard 6 is preferably in a plane at right angles to, and normal to, the plane of the hook, each arm of the guard may slope outwardly slightly toward the point or slightly toward the eye, a few degrees. However, either slope must be very limited so that the guard does not act as a cam surface which tends to cam open the mouth of the fish should its lips engage it in the attempt by the fish to swallow the hook.

It is best, as mentioned, that the shoulder afforded by the guard 6 to a fish when swallowing the hook be a very abrupt shoulder, preferably ninety degrees to the axis of the shank, so that it does not tend to part the lips of the fish.

With a guard so proportioned and arranged transversely of the plane of the hook, it is apparent that the hook can be baited in the usual manner without any interference. Furthermore, since the guard is balanced at opposite sides of the plane, it does not interfere with the normal balance and behavior of the hook in the water, or cause the hook to rotate and twist the line.

It is noted, too, that, in grasping a hook, fish customarily grab from the side of the hook so that the hook usually enters their mouth with the plane of the hook extending from one side of the mouth to the other. Thus, the hook of the present invention would ordinarily be grasped in such a position that the guard 6 would extend in the direction of movement apart of the lips of the fish. The guard is used customarily only on smaller hooks of a size in which a fish which is normally too small for eating or below the legal limit is apt to be caught.

Having thus described my invention, I claim:

A fish hook having a shank with a hook portion on one end of the shank, attaching means on the other end of the shank for securing the hook to a line, a guard comprising a single length of wire fixedly secured intermediate its ends to the shank and spaced endwise of the shank between, and in spaced relation endwise of the shank to, the point and attaching means, said guard extending at substantially right angles to the plane of the hook and equidistantly at opposite sides of said plane, said guard being a minimum length of three times the distance from the point of the hook to the axis of the shank of the hook, and said guard being spaced axially of the shank from the base of the hook portion toward the other end of the shank a distance approximately equal to its own length.

References Cited in the file of this patent
UNITED STATES PATENTS
2,242,708    Lancaster ------------- May 20, 1941
FOREIGN PATENTS
108,745    Australia -------------- Oct. 19, 1939